United States Patent
Bilinski et al.

(10) Patent No.: US 9,773,057 B2
(45) Date of Patent: Sep. 26, 2017

(54) CONTENT ITEM USAGE BASED SONG RECOMMENDATION

(71) Applicant: Google Inc., Mountain View, CA (US)

(72) Inventors: Brandon Bilinski, San Francisco, CA (US); Alexander Collins, San Francisco, CA (US)

(73) Assignee: Google Inc., Mountain View, CA (US)

( * ) Notice: Subject to any disclaimer, the term of this patent is extended or adjusted under 35 U.S.C. 154(b) by 442 days.

(21) Appl. No.: 14/297,786

(22) Filed: Jun. 6, 2014

(65) Prior Publication Data

US 2015/0356176 A1    Dec. 10, 2015

(51) Int. Cl.
*G06F 17/30* (2006.01)

(52) U.S. Cl.
CPC .. *G06F 17/30761* (2013.01); *G06F 17/30598* (2013.01); *G06F 17/30743* (2013.01); *G06F 17/30867* (2013.01)

(58) Field of Classification Search
CPC ......... G06F 17/30707; G06F 17/30595; G06F 17/3061; H04L 67/22; H04L 67/02; H04L 67/20; H04L 67/306
USPC ................................................. 707/740, 723
See application file for complete search history.

(56) References Cited

U.S. PATENT DOCUMENTS

| | | | |
|---|---|---|---|
| 7,794,325 B2 * | 9/2010 | Hawkins | A63F 13/10 463/35 |
| 8,175,989 B1 | 5/2012 | Gopinath et al. | |
| 2007/0074619 A1 | 4/2007 | Vergo | |
| 2009/0044686 A1 * | 2/2009 | Vasa | G11B 27/031 84/609 |
| 2009/0307176 A1 * | 12/2009 | Jeong | G06F 17/30702 706/52 |
| 2011/0288929 A1 | 11/2011 | Mei et al. | |
| 2011/0295843 A1 * | 12/2011 | Ingrassia, Jr. | G06F 17/30053 707/723 |

(Continued)

FOREIGN PATENT DOCUMENTS

| | | |
|---|---|---|
| WO | 2012038007 A2 | 3/2012 |
| WO | 2013046220 A2 | 4/2013 |

OTHER PUBLICATIONS

Joly, "Contextual Recommendation of Social Updates, a Tag-Based Framework", Active Media Technology, Springer Berlin Heidelberg, XP019150344, ISBN: 978-3-642-15469-0, Aug. 28, 2010, pp. 436-447.

(Continued)

*Primary Examiner* — Hosain Alam
*Assistant Examiner* — Robert F May
(74) *Attorney, Agent, or Firm* — Morris & Kamlay LLP

(57) ABSTRACT

Implementations of the disclosed subject matter provide techniques for recommending a song to a user based on the user's application usage information. A method may include receiving an indication of playback of a first song, by a first user, in a media application operating on a first device. It may be determined that a first content item is active on the first device during playback of the first song. An association may be stored of the first content item with the first song. Next, an indication may be received that the first content item is active on the first device. As a result, a second song associated with the first content item, based on the association of the first content item with the first song, may be recommended to the first user.

18 Claims, 4 Drawing Sheets

(56) References Cited

U.S. PATENT DOCUMENTS

| | | | |
|---|---|---|---|
| 2012/0084292 A1 | 4/2012 | Liang et al. | |
| 2012/0191706 A1* | 7/2012 | Song | G06K 9/6272 707/736 |
| 2013/0159234 A1* | 6/2013 | Xing | H04M 1/72569 706/46 |
| 2013/0268543 A1* | 10/2013 | Andler | G06F 17/30595 707/748 |
| 2014/0277649 A1* | 9/2014 | Chong | G06F 17/30752 700/94 |

OTHER PUBLICATIONS

Lee, et al., "Context Awareness by Case-Based Reasoning in a Music Recommendation System", Ubiquitous Computing Systems; Lecture Notes In Computer Science, Springer Berlin Heidelberg, XP019083064, ISBN: 978-3-540-76771-8, Nov. 25, 2007, pp. 45-58.
PCT/US2015/032576, International Search Report and Written Opinion issued in PCT/US2015/032576 dated Aug. 19, 2015, Aug. 19, 2015, 18.
International Preliminary Report on Patentability dated Dec. 6, 2016 as received in Application No. PCT/US2015/032576.
Adrien Joly et al: "Contextual Recommendation of Social Updates, a Tag-Based Framework", Aug. 28, 2010.
Jae Sik Lee et al: "Context Awareness by Case-Based Reasoning in a Music Recommendation System", Nov. 25, 2007 (Nov. 25, 2007).

* cited by examiner

CONTENT ITEM USAGE BASED SONG RECOMMENDATION

BACKGROUND

In general, categorization of songs in the music space is limited to genres. For example, if a user wants to listen to rock or hip-hop, it can be relatively easy to find music in a specific genre. But in some cases a user may wish to define a different category of music, such as music appropriate for play while the user is at the gym, driving, or reading a book. Categories such as "gym music", "reading music" and "driving music" may overlap with multiple genres, and songs in these categories can be difficult to tag on a song-by-song basis in an automatic way.

BRIEF SUMMARY

According to an embodiment of the disclosed subject matter a method may include receiving an indication of playback of a first song, by a first user, in a media application operating on a first device. It may be determined that a first content item is active on the first device during playback of the first song. An association may be stored of the first content item with the first song. Next, an indication may be received that the first content item is active on the first device. As a result, a second song associated with the first content item, based on the association of the first content item with the first song, may be recommended to the first user.

According to an embodiment of the disclosed subject matter a method may include determining that a first content item is active on a first device during playback of a first song, by a first user, in a media application operating on the first device. An association of the first content item with the first song may be stored. Next, an indication may be received that the first content item is active on a second device associated with a second user. As a result, a recommendation may be provided to the second user of a second song based on the association of the first content item with the first song, and the first song and the second song may have a common attribute.

An implementation of the disclosed subject matter provides a system including a processor configured to receive an indication of playback of a first song, by a first user, in a media application operating on a first device. It may be determined that a first content items is active on the first device during playback of the first song. An associated may be stored of the first content item with the first song. Next, an indication that a first content item is active on the first device may be received. As a result, a recommendation may be provided to the first user of a second song associated with the first content item based on the association of the first content item with the first song.

An implementation of the disclosed subject matter provides a system which includes means for receiving an indication of playback of a first song, by a first user, in a media application operating on a first device. The system may also include means for determining that a first content item is active on the first device during playback of the first song and means for storing an association of the first content item with the first song. Further, the system may include means for receiving an indication that the first content item is active on the first device; and means for recommending, to the first user, a second song associated with the first content item based on the association of the first content item with the first song.

Implementations of the disclosed subject matter provide techniques for improved music recommendations for a user based on content item (e.g., an application or website) usage data associated with the user. The present disclosure provides a technique for recommending music to a user based on one or more content items that are currently operating on the user's device. In particular, the disclosed system may store associations of song playback with content item usage and aggregate this data from multiple users. As a result, this data may be used to provide music recommendations to a user based on the specific content item that is currently active on the user's device. The techniques disclosed herein allow for the use of specific content item and/or categories of content items as a signal for providing music recommendations to a user of a particular content item, which may add an extra level of personalization and accuracy of music recommendations to a user. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
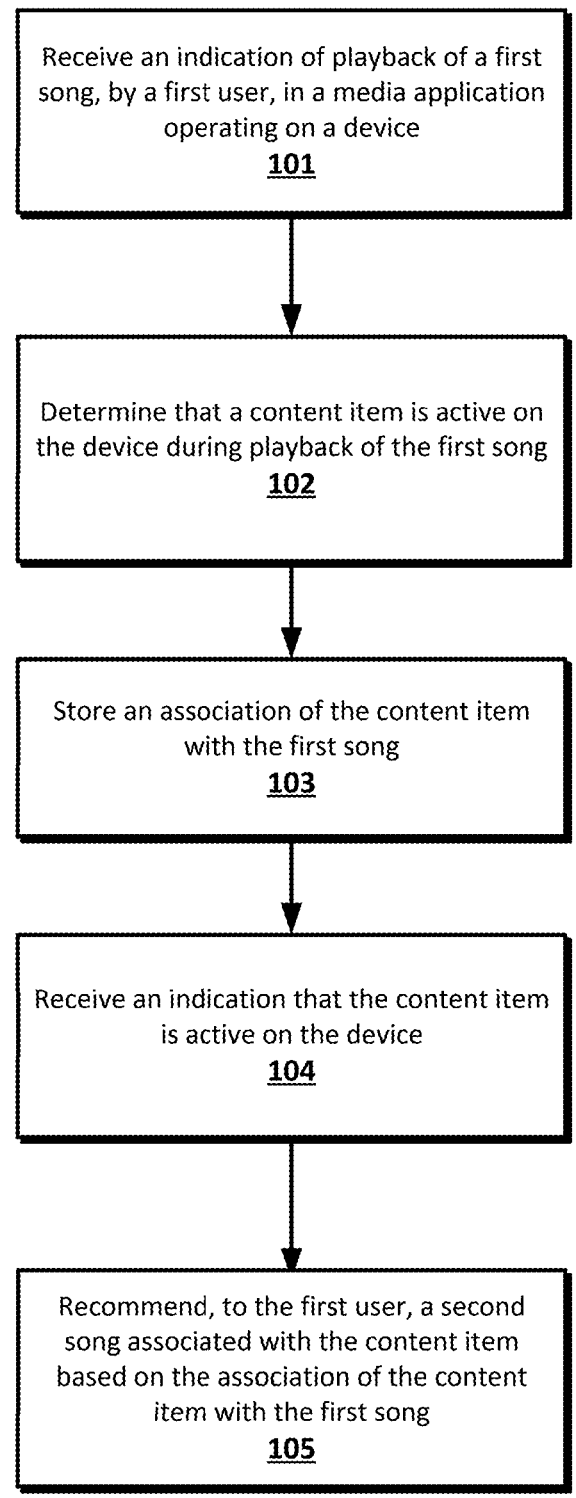
FIG. 1 shows an example process according to an implementation of the disclosed subject matter.

Categorization of music in the music space is limited to genres. For example, if a user wants to listen to rock or hip-hop, it can be relatively easy to find music in those specific genres. But in some cases, a user may wish to listen to music that is tailored to the specific content item (e.g., an application, a website, and the like) operating on the user's device. For example, a user may want to listen to "gym" music while at the gym and using a fitness application. As another example, a user may want to listen to "driving" music while using a map or navigation application or a user may want to listen to music while reading a book using an e-reader application. Categories such as "gym music", "reading music" and "driving music" may overlap with multiple genres of music, and songs in each of these categories can be difficult to tag on a song-by-song basis in an automatic way. Furthermore, recommending songs, perhaps from different genres, to a user of a particular content item can enhance the user's experience while using content items on his device.

In general, a media application operating on a user's device is typically connected to a media application provider which may provide songs and recommendations of songs to the user. In some cases, a media application provider may provide song recommendations based on a user's actions within a media application. For example, if a user plays a song A, a media service provider may recommend another song B having similar attributes to song A based on the user's action (i.e., playing song A) in the media application. However, in some cases, a user may listen to or prefer particular songs or a genre of songs while using certain applications (other than the media application) operating on the user's device.

The present disclosure provides a technique for recommending music to a user based on one or more content items that are currently active on the user's device. A content item may be an application, a website, a program, or any other similar content that may be active on a device. For example, a content item such as a website may be active on a device if it is open in a browser on the device. A content item such as an application may be active on a device if it is operating on the device. Similarly, a content item may be active on a device if it is determined that the user of the device is interacting with the content item. According to the present disclosure, by using a user's application usage to recommend songs, a user may receive song recommendations that are more closely tailored to his current environment and activities and may result in an improved user experience. For example, Paul may prefer hip hop music and he may also use fitness applications, and it may be advantageous to recommend hip hop songs to Paul while a fitness application is active on his device. In this case, a media application provider may recommend hip hop songs to Paul that are listened to by other users of fitness applications. As another example, Tim may always listen to classical songs while using an e-reader application Bookbug. In this case, a media application provider may recommend classical songs to Tim when he activates a different e-reader application such as LibraryGeek on his device since LibraryGeek is in the same application category, i.e., e-reader application, as Bookbug. As yet another example, Sara may often play the puzzle gaming application 1983. As a result, a media application provider may recommend to Sara the most popular songs that are listened to by other users while playing the 1983 application or while playing other puzzle gaming applications.

While a user is operating a media application on a device and listening to music, a song to which the user is listening may be associated with one or more content items that the user is currently interacting with on the device. This data may be stored at a user's device or at remote device (e.g., a cloud-based database) and may be provided to a central server (which may or may not be a separate entity from a media application provider) where song playback and content item usage information may be aggregated and received from multiple users. A song may be associated with the specific content item name and/or the category of content item that was active on the user's device during playback of the song. This association of a song with a content item and/or content item category can then be used to cluster songs together based on categorical content item usage and used to recommend songs to a user while the content item or another content item in the same category is active on the user's device.

According to the present disclosure, storing an association (e.g. tagging) of a song with a content item may include storing a history of all songs played on a device, song metadata (e.g., title, artist, album), and all of the foreground and background content items active on the device during playback of each song. As an example, on a device a user may be listening to Heart by Darkside. During playback of the song, the user may activate a news reader application for the duration of the song. A listening history stream may be provided to a media application provider and may include an association of the song Heart with the news reader application and may include, for example, the song metadata, a timestamp in the song at which the news reader application was activated, the name of the application, and the category of application (e.g., news reader). Associations of songs and content items received from multiple devices may be stored, for example, in a table. This table may be pivotable on song, artist, genre, content item category, name of content item, etc. As a result, data in this table may sorted, filtered, and/or viewed in a way that allows for selection of a song to recommend to a user based on a content item that is active on a user's device and/or a user's music preference. For example, this table could be used to generate a list of all songs played while the New4you application was active on multiple user devices and these songs may be sorted by play count. As another example, this table could be used to view which genre of music is over-represented in a specific content item category such as news reader applications versus all other applications or content item categories. As a result, associations of songs and content items may be subsequently used by a media application provider to recommend songs to the user and/or other users, for example, while the particular news reader application or another news reader application is active on a user's device.

In general, the present disclosure provides a technique for recommending music to a user based on a content item (e.g., an application, a website, etc.) that is currently active on the user's device. FIG. 1 shows an example process according to an implementation of the disclosed subject matter. As shown, a media application and/or a media application provider may receive an indication of playback of a first song, by a first user, in a media application operating on a device, at 101. A media application may be any application that may be used for playback of media content such as music, songs, albums, playlists, radio stations, audio files, and the like. In general, a user may be able to control playback of media content in a media application based on a variety of actions such as playing, stopping, pausing, rewinding, fast forwarding, and skipping media content. A user may also be able to browse and search for media content, create a playlist, share a playlist, listen to a radio station, and the like, within a media application. A media application may be operated on any suitable device such as a mobile device, a smartphone, a tablet, a laptop, a PC, a wearable device, and the like. A media application provider may be the provider of a media application and/or media content. In some cases, a media application provider and a media application may be managed by the same entity.

During playback of a first song in a media application, it may be determined that a content item is active on the device, at 102. A content item may be any item and/or program that may be active on a device such as an application, a website, and the like. A content item may be categorized into a content item category based on any suitable characteristics of the content item such as features, subject matter, function, type, utility, purpose, ratings, geographic region, etc. Examples of content item categories may be health/fitness, games, food/drink, entertainment, education, finance, kids, lifestyle, medical, music, news, photo/video, productivity, sports, travel, social networking, weather, and any other category that may be suitable for categorizing one or more content items. Multiple content items may be categorized into the same content item category and some content items may be categorized into more than one content item category. For example, the website financialcalculators.com and the website financialnews.com may both be categorized in the finance content item category. Additionally, financialnews.com may be categorized in the finance content item category as well as the news content item category.

A determination that a content item is active on a device, at 102, may be made by the device, the media application, a media application provider, and/or a coordinating application (which may or may not be a component of the media application) that may run on the device or in a browser. Next, an association of the content item with the first song may be stored, at 103. As an example, in the case of a coordinating application, the coordinating application may determine that the media application is operating on the device and may store and track a history of all songs played during the time period that a media application is operating on the device. In addition to collecting and storing song metadata (e.g., title, artist, album, etc.), the coordinating application may also store the foreground and background content items that are active on the device during the duration of the song along with a timestamp within the song of usage of each content item. For example, a user may be listening to the song Heart by Darkside and at a timestamp location of 01:23 within the song, the user may launch and activate the application newsforme for the duration of the song. As a result, for example, the coordinating application may store the song metadata, the 01:23 timestamp, the name of the application, "newsforme," and the content item category of news reader. In general, storing an association of a content item with a song may include an identification of the song, an identification of an artist associated with the song, a genre associated with the song, an identification of the content item, and a content item category associated with the content item. In some cases the association of a content item with a song may be provided to a media application provider.

Multiple associations of content items with songs may be received from multiple devices on which a media application is operating. Associations of content items with songs may be stored in any format that may be used to indicate a relationship between a content item and a song. For example, a table, a hash table, a database, a song may be tagged to indicate that it is related to a content item, a content item may be tagged to indicated that it is related to a song, songs related to a particular content item may be categorized as such, content items related to a particular song may be categorized as such, and the like. As an example, a media application provider may receive and aggregate song and content item associations, and may store this information in a table. This table may be pivotable on song, artist, genre, content item category, name of content item, and any other data included in a stored association. As a result, data in this table may sorted, filtered, and/or viewed to allow for identification of a song to recommend to a user based on a content item that is active on a user's device and/or a user's music preference. For example, this table could be used to generate a list of all songs played while the New4you application was active on user devices and these songs may be sorted by play count. As another example, this table could be used to view which genre of music is over-represented in a specific content item category such as news reader applications versus all other applications or content item categories. As a result, for example, associations of songs and content items may be subsequently used by a media application provider to recommend songs to the user and/or other users while the particular news reader application or another news reader application is active on a user's device. As a specific example, Paul may prefer hip hop music and he may also use fitness applications. Accordingly, the table may be filtered in order to identify hip hop songs that are associated with fitness applications in order to identify a song to recommend to Paul.

Referring back to FIG. 1, an indication may be received that a content item is active on the device, at 104. For example, an indication may be received by the device, the media application, a media application provider, a remote device, and/or a coordinating application (which may or may not be a component of the media application) that may run on the device or in a browser. As a result, a second song associated with the active content item may be recommended to the user based on the association of the content item with the first song, at 105. In some cases, the step of recommending, to the user, a second song associated with the first content item based on the association of the first content item with the first song may be performed by a media application provider.

Recommendation of a particular song associated with a content item that is active on a device may be based on an association of the content item with another song. As a specific example, a media application provider may receive an indication of playback of the song Pure by Tim in a media application operating on Tim's device. It may be determined that the website moneymaker.com is active on a Tim's device during playback of the song Pure. As a result, an association of moneymaker.com with the song Pure may be stored. This association may then be used to make song recommendations to Tim and/or another user when the moneymaker.com website is active on Tim's and/or another user's device. This recommendation based on an association of a content item with a song may be made at any time after the association has been stored. For example, at some point after the association of moneymaker.com with the song Pure is stored, the media application provider may receive an indication that the website moneymaker.com is active on Tim's device. As such, based on the association of moneymaker.com with the song Pure, the media application provider may recommend to Tim the song Honey, which may also be associated with moneymaker.com. It may be the case that the song Honey is of the same genre as the song Pure. It may also be the case that one or more other users have played the song Honey while moneymaker.com was active on their device(s), and as such, an association may have been stored of moneymaker.com with the song Honey.

In some cases, recommending a song associated with a content item to a user may be further based on a user music preference associated with the user. As in the example above, the song Pure may be a pop song and/or Tim may often listen to pop music. Based on his preference for pop music, the media application provider may recommend the song Market which may be another pop song associated with moneymaker.com. As another example, an indication may be received of playback by Ben of the rock song Market Case in a media application operating on Ben's device. It may be determined that the application NavigateUs is active on Ben's device during playback of the song Market Case. An association of the application NavigateUs with the song Market Case may be stored. A media application provider may receive an indication that Ben prefers rock music. In general, Ben's preference for rock music may be based on a user setting, a listening history associated with Ben's media application account, a music library associated with Ben's media application account, and any other way of determining a user's music preference. Subsequent to storing the association of the application NavigateUs with the song Market Case, an indication may be received that the NavigateUs application is active on Ben's device. Based on the association of NavigateUs with the song Market Case and based on Ben's preference for rock music, the rock song Butter Cup (in some cases an association of the song Butter Cup with the application NavigateUs may have been previously stored) may be recommended to Ben.

In addition, recommendation of a song may also be provided for a content item that is in the same category as another content item for which an association has been stored. As in the example above, an indication may be received that the website financialbasket.com is active on Tim's device. The websites financialbasket.com and moneymaker.com may be in the same content item category of finance. As such, the song Honey may be recommended to Tim based on the previously stored association of moneymaker.com with the song Pure. As another example, an indication of playback, by Greg, of the song Weight in D (e.g., a classical song) in a media application operating on Greg's device. It may be determined that the application ReaderBee, an e-reader application, is active on Greg's device during playback of the song Weight in D. As a result, as association of the application ReaderBee with the song Weight in D may be stored. Subsequently, an indication may be received that the application BooksGalore, an e-reader application, is active on Greg's device. Based on the association of the e-reader application ReaderBee with the classical song Weight in D, the song 2014 Overture (e.g. a classical song) may be recommended to Greg while the e-reader application BooksGalore is active on his device.

The steps described above may be performed for additional users. For example, an indication may be received that a content item is active on a second device. As such, a second song associated with the content item may be recommended to a second user based on the association of the content item with the first song. Continuing with the example above, an indication may be received that financialbasket.com is active on Fred's device. Again, financialbasket.com and moneymaker.com may be in the same content item category of finance. As such, the song Honey, which may also be associated with moneymaker.com, may be recommended to Fred based on the previously stored association of moneymaker.com with the song Pure.

Figure 2:
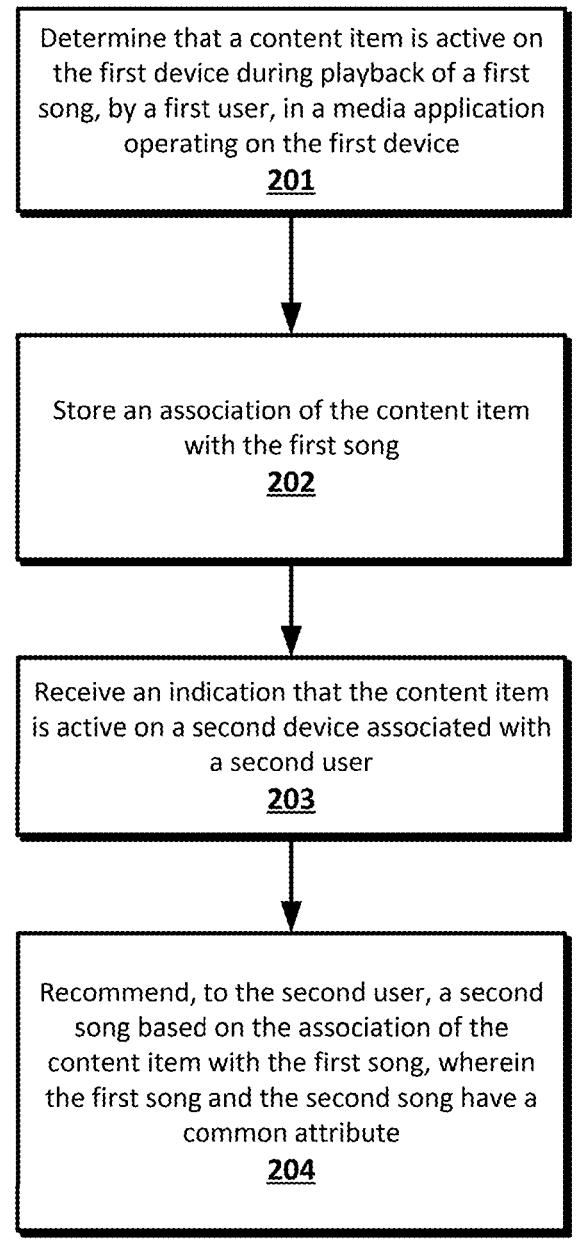
FIG. 2 shows an example process according to an implementation of the disclosed subject matter.

FIG. 2 shows an example process according to an implementation of the disclosed subject matter. As shown, a method may include determining that a content item is active on a first device during playback of a first song, by a first user, in a media application operating on the first device, at 201. An association of the content item with the first song may be stored, at 202. Subsequently, an indication may be received that the content item is active on a second device associated with a second user, at 203. As a result, at 204, a second song may be recommended to the second user based on the association of the content item with the first song and the first song and the second song may have a common attribute. As an example, it may be determined that the application Recipesfor2 is active on Katy's device during playback of the song Party Chick in a media application operating on Katy's device. An association of Recipesfor2 with the song Party Chick may be stored. Subsequently, an indication may be received that the application Recipesfor2 is active on Jenny's device. The song Party Chick may have a common attribute with the song Celebrate, for example, both songs may be from the pop genre. A common attribute between two songs may be any common characteristic, quality, categorization, and the like, of the songs. Examples of common attributes may be genre, artist, album, association with a particular content item, release date, and the like. The song Celebrate may be recommended to Jenny based on the association of Recipesfor2 with the song Party Chick. For example, a media application provider may recommend the song Party Chick to Jenny upon receiving an indication that Recipesfor2 is active on Jenny's device.

Upon receiving an indication that a particular content item is active on a user's device, recommendation of a song to a user may be provided according to any suitable technique for recommending a song to a user of a media application. For example, a song recommendation may be presented in an interface component of a media application operating on a user's device, such as a push notification which may ask the user if he wishes to listen to a recommended song. As another example, a playlist may be generated within a media application and provided to the user. The playlist may include recommended songs from among which the user may select and/or initiate playback of one or more songs.

As the one or more content items active on a user's device change, the song recommendations may also change respectively. As an example, it may be the case that the user is currently listening to a radio station within a media application operating on the user's device. Upon receiving an indication that a content item is active on the user's device, a media application provider may add one or more recommended songs to the queue of songs associated with the radio station to which the user is listening based on the content item that is active on the user's device. As a result, while a user is listening to the radio station and interacting with In some cases, a user may not be operating a media application on her device at the time when an indication is received that a content item is active on the user's device. In this case, a recommended song may be provided to the user via a push notification or the like. For example, Jackie may not be listening to music on her device when she activates the Floppy Cat application. Upon receiving an indication that the Floppy Cat application is active on Jackie's device, a push notification may be provided to Jackie's device including a recommendation for the song Cherry Zero. The song Cherry Zero may be associated with the Floppy Cat application based on other users listening to the song Cherry Zero, or another song that has a common attribute with Cherry Zero, while the Floppy Cat application was active on their devices. As a specific example, many users of the Floppy Cat application may listen to songs in the indie/pop genre while the Floppy Cat application is active on their devices. As a result, associations of song in the indie/pop genre with the Floppy Cat application may be stored. Based on these associations, the song Cherry Zero, which may also be in the indie/pop genre, may be recommended to Jackie upon receiving an indication that the Floppy Cat application is active on Jackie's device.

Figure 3:
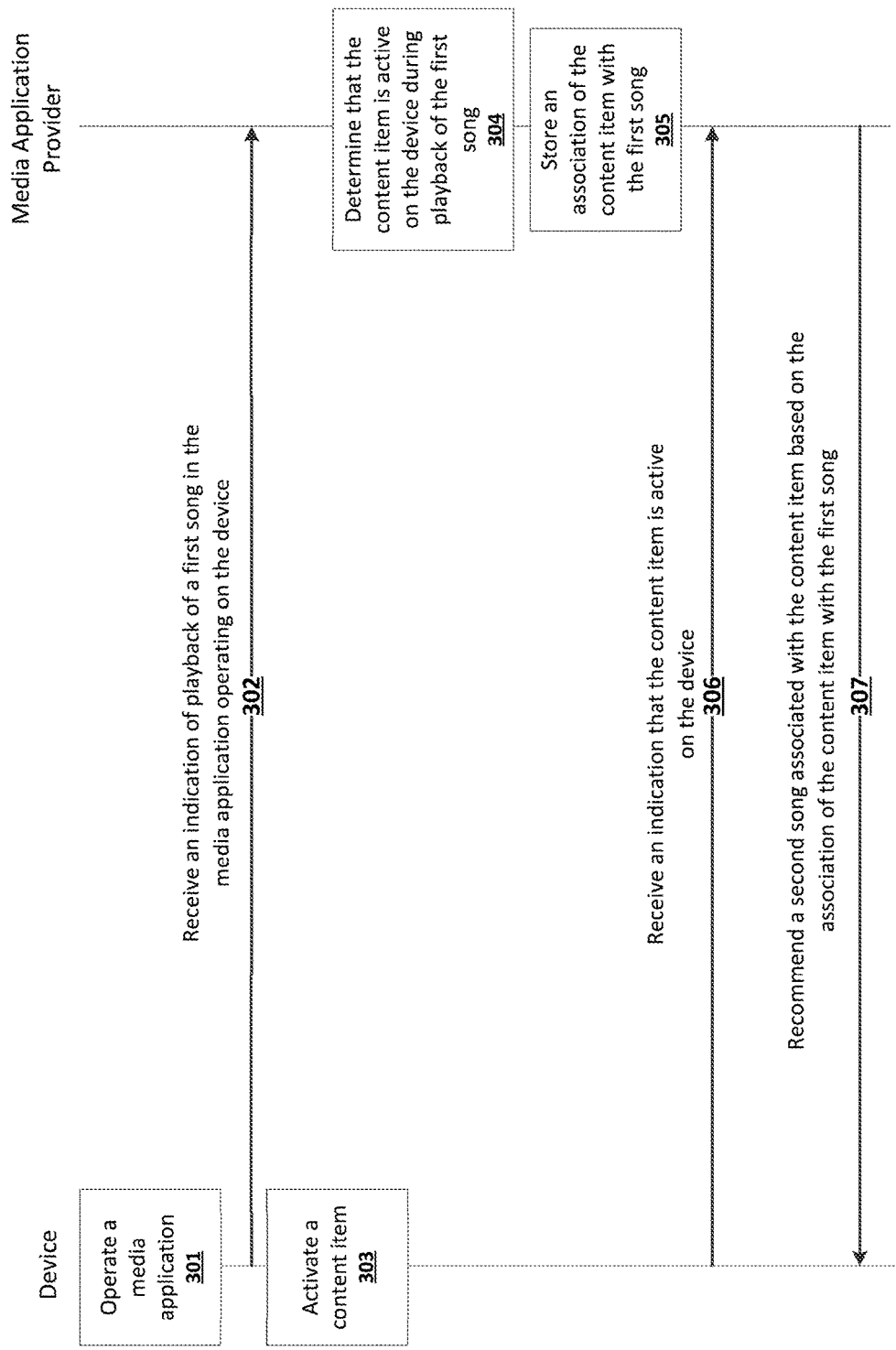
FIG. 3 shows an example information flow according to an implementation of the disclosed subject matter.

Techniques disclosed herein may be implemented according to various system arrangements. FIG. 3 shows an example information flow according to an implementation of the disclosed subject matter. As shown, a device may operate a media application at 301 and a media application provider may receive, from the device (e.g., from the media application or a coordinating application), an indication of playback of a first song in the media application operating on the device, at 302. A content item may be activated on the device, at 303. The media application provider may determine that the content item is active on the device during playback of the first song, at 304. This determination may be made by the media application provider based on an indication received from the device (e.g., from a coordinating application which may be collecting song playback and content item activation data). As a result, the media application provider may store an association of the content item with the first song, at 305. Subsequently, the media application provider may receive, from the device (e.g., from the media application or a coordinating application), an indication that the content item is active on the device, at 306. Based on the indication that the content item is active on the device, the media application provider may recommend a second song associated with the content item based on the association of the content item with the first song, at 307. For example, the media application provider may have previously stored an association of the second song with the content item.

In an implementation, the communication between a device, a media application, and/or a media application provider may be across one or more bridges between the interfaces. For example, the communications between a media application and a media application provider may be managed or assisted by a coordinating application (which may or may not operate on the same device on which the media application is operating) or a third device, such as, a coordinating device, a local coordinator, a remote server, etc. In such cases, the coordinating application and/or third device may, for example, receive an indication of playback of a song in the media application operating on a device and provide the indication to the media application provider. The coordinating application and/or third device may also receive indications of one or more content items active on a device during playback of a song and provide the indications and provide the indications to the media application provider. The coordinating application and/or third device may also receive an indication that a content item is active on the device and may provide this indication to the media application provider. Similarly, the third device may also receive a recommended song from a media application provider and provide the recommended song to the media application operating on the device. Furthermore, more than one intermediate device may be implemented to facilitate communication between the devices, one or more media applications and a media application provider.

As described above, implementations of the disclosed subject matter provide techniques for improved music recommendations for a user based on content item (e.g., an application or website) usage data associated with the user. The present disclosure provides techniques for recommending music to a user based on one or more content items that are currently active on the user's device. In particular, the disclosed subject matter may store associations of song playback with content item usage and aggregate this data from multiple users. As a result, this data may be used to provide music recommendations to a user based on the specific content item that is currently active on the user's device. By associating songs with content items, music recommendations provided to a user while the user is interacting with a particular content item may be more relevant and the user may be more likely to enjoy the recommended songs. Specifically, the techniques disclosed herein allow for the use of specific content item and/or categories of content items as a signal for providing music recommendations to a user of a particular content item, which may add an extra level of personalization and accuracy for providing music recommendations to a user.

Figure 4:
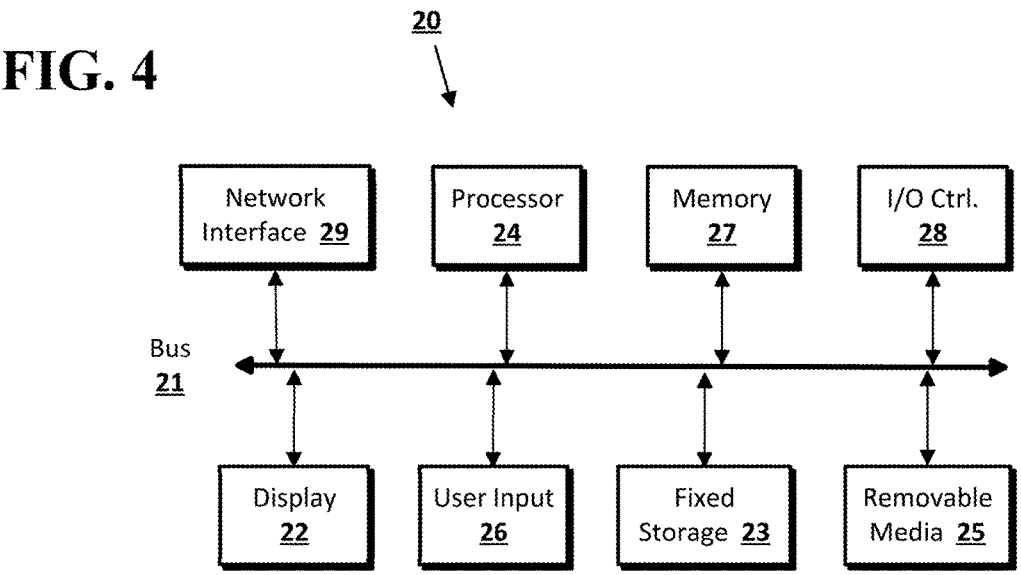
FIG. 4 shows a computer according to an embodiment of the disclosed subject matter.

Embodiments of the presently disclosed subject matter may be implemented in and used with a variety of component and network architectures. FIG. 4 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 5.

Many other devices or components (not shown) may be connected in a similar manner, such as document scanners, digital cameras, auxiliary, supplemental, or backup systems, or the like. Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 5:
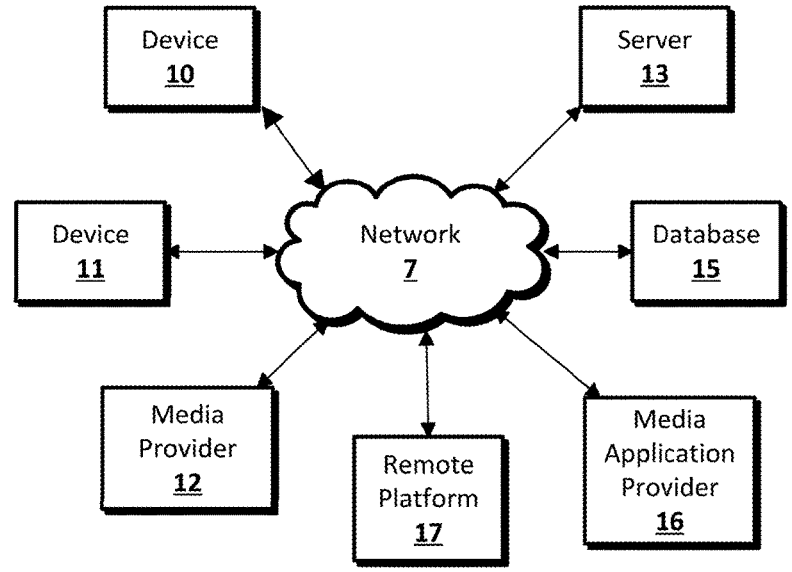
FIG. 5 shows a network configuration according to an embodiment of the disclosed subject matter.

FIG. 5 shows an example network arrangement according to an embodiment of the disclosed subject matter. One or more clients 10, 11, such as local computers, smart phones, tablet computing devices, media provider 12, media application provider 16, and the like may connect to other devices via one or more networks 7. The network may be a local network, wide-area network, the Internet, or any other suitable communication network or networks, and may be implemented on any suitable platform including wired and/or or wireless networks. The clients may communicate with one or more servers 13, media provider 12, media application provider 16, and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13, media provider 12, media application provider 16, and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other non-transitory machine readable storage medium, such that when the computer program code is loaded into and executed by a computer, the computer becomes an apparatus for practicing embodiments of the disclosed subject matter. Embodiments also may be embodied in the form of computer program code, for example, whether stored in a non-transitory storage medium, loaded into and/or executed by a computer. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   Receiving an indication of playback of a first song, by a first user, in a media application operating on a first device;
   Determining that a first application is active on the first device during playback of the first song;
   Storing an association of the first application with the first song;
   Receiving an indication that the first application is active on a second device associated with a second user;
   Recommending, to the second user, the first song associated with the first application based on the association of the first application with the first song;
   Receiving an indication that a second application is active on the second device, wherein the second application is in a same application category as the first application; and
   Recommending, to the second user, a second song based on an association of the first application with the second song.

2. The method of claim 1, further comprising providing the association of the first application with the first song to a media application provider.

3. The method of claim 1, wherein the step of recommending, to the second user, the first song associated with the first application is based on the association of the first application with the first song is performed by a media application provider.

4. The method of claim 1, wherein recommending to the second user, the first song associated with the first application is further based on a user music preference associated with the second user.

5. The method of claim 1, wherein the association of the first application with the first song includes an identification of the first song, an identification of an artist associated with the first song, a genre associated with the first song, an identification of the first application, and an application category associated with the first application.

6. The method of claim 1, further comprising receiving an indication of playback of the second song, by the second user, in a media application operating on the second device;
   determining that the second application is active on the second device during playback of the second song; and
   storing an association of the second application with the second song.

7. The method of claim 1, wherein the first application is categorized into at least one application category.

8. The method of claim 1, wherein the first song is of a same genre as the second song.

9. A method comprising:
   determining that a first application is active on a first device during playback of a first song, by a first user, in a media application operating on the first device;
   Storing an association of the first application with the first song;
   Receiving an indication that the first application is active on a second device associated with a second user;
   Recommending, to the second user, a second song based on the association of the first application with the first song, wherein the first song and the second song have a common attribute;
   Receiving an indication that a second application is active on the second device, wherein the second application is in the same application category as the first application; and
   Recommending, to the second user, a third song based on an association of the first application with the third song.

10. The method of claim 9, wherein the first song and the second song are the same.

11. A system comprising:

a processor configured to:
Receive an indication of playback of a first song, by a first user, in a media application operating on a first device;
Determine that a first application is active on the first device during playback of the first song;
Store an association of the first application with the first song;
Receive an indication that the first application is active on a second device associated with a second user;
Recommend, to the second user, the first song associated with the first application based on the association of the first application with the first song;
Receiving an indication that a second application is active on the second device, wherein the second application is in a same application category as the first application; and
Recommending, to the second user, a second song based on an association of the first application with the second song.

12. The system of claim 11, further comprising providing the association of the first application with the first song to a media application provider.

13. The system of claim 11, wherein the step of recommending, to the second user, the first song associated with the first application is based on the association of the first application with the first song is performed by a media application provider.

14. The system of claim 11, wherein recommending, to the second user, the first song associated with the first application is further based on a user music preference associated with the second user.

15. The system of claim 13, wherein the association of the first application with the first song includes an identification of the first song, an identification of an artist associated with the first song, a genre associated with the first song, an identification of the first application, and a application category associated with the first application.

16. The system of claim 11, wherein the processor is further configured to receive an indication of playback of the second song by the second user, in a media application operating on the second device;
Determine that the second application is active on the second device during playback of the second song; and
Store an association of the second application with the second song.

17. The system of claim 11, wherein the first application is categorized into at least one application category.

18. The system of claim 11, wherein the first song is of the same genre as the second song.

* * * * *